United States Patent Office 2,967,356
Patented Jan. 10, 1961

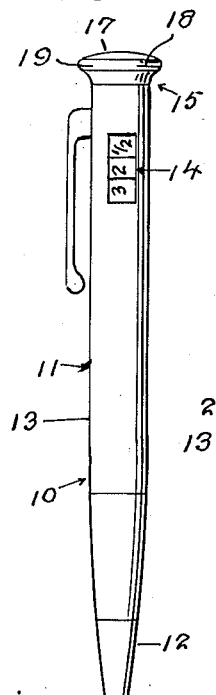

2,967,356

ROLLER REGISTER

John H. Morehead, 1420 Rose Ave., Long Beach, Calif.

Filed Oct. 4, 1957, Ser. No. 688,230

1 Claim. (Cl. 33—141)

This invention relates to a measuring instrument, and more particularly to a measuring instrument which is incorporated in a writing instrument such as a pen or pencil.

The object of the invention is to provide a measuring instrument which is adapted to be operatively associated with a pen such as a ball point pen or a pencil, and wherein the writing instrument includes a means for measuring distances along a surface being measured.

This invention is an improvement over the measuring instrument shown and described in my prior Patent No. 2,363,545.

Another object of the invention is to provide an instrument which includes in one end a writing tip such as a pen or pencil, and wherein the other end of the instrument is provided with means which can be rolled along a surface so that distances on the surface can be accurately measured, there being indicia or scale markings for indicating to the user the distance being measured along the surface.

Another object of the invention is to provide a measuring instrument which is extremely simple and inexpensive to manufacture.

Other objects and advantages will be apparent during the course of the following description.

In the accompanying drawings, forming a part of this application, and in which like numerals are used to designate like parts throughout the same.

Figure 1 is an elevational view illustrating the measuring instrument of the present invention.

Figure 2 is a fragmentary enlarged sectional view illustrating a portion of the instrument.

Figure 3 is a sectional view taken on the line 3—3 of Figure 2.

Figure 4 is a sectional view taken on the line 4—4 of Figure 3.

Figure 5 is a sectional view taken on the line 5—5 of Figure 3.

Figure 6 is a sectional view taken on the line 6—6 of Figure 3.

Figure 7 is a sectional view taken on the line 7—7 of Figure 3.

Figure 8 is a sectional view illustrating certain constructional details of the device.

Figure 9 is a sectional view illustrating one of the parts of the device.

Figures 10 and 11 are plan views illustrating schematically the scale markings or indicia on the movable members for indicating distances being measured.

Referring in detail to the drawings, the numeral 10 indicates the instrument of the present invention, and the instrument 10 includes a hollow housing 11 which has a writing tip 12 on one end thereof. The writing tip 12 may be a pencil, ball point pen or the like. The housing 11 includes a cylindrical wall member 13 which is provided with a cutout 14 that defines a window for a purpose to be lated described.

The numeral 15 indicates a rotary wheel which has a portion 16 of reduced diameter, and the portion 16 projects into the housing 11, as for example as shown in Figure 3. The wheel 15 further includes an outer portion 17 of increased size, and the portion 17 is provided with an annular groove 18 in which is seated a tire or surface engaging element 19 which is adapted to be made of a suitable material such as rubber or plastic.

There is provided in the outer surface of the wheel 15 intermediate the ends thereof, an annular recess 20, and seated in the recess 20 is a split ring member 21 which engages the wall member 13 of the housing 11. The inner end of the wheel 15 is provided with a hollow chamber 23 which defines a cylindrical flange 22, and extending inwardly from the flange 22 and secured thereto or formed integral therewith is a pair of diametrically opposed cam members 24.

Secured within the housing 11 is a cylindrical support member 25, and a shaft 26 extends through the support member 25 and abuts the inner end of the wheel 15. The numeral 27 indicates a first pinion gear which is rotatably mounted on an end of the shaft 26, and the pinion gear 27 is adapted to engage the cam members 24 on the flange 22. The support member 25 is provided with an opening 28, and a first spring member 29 has a portion thereof projecting through the opening 28, while the other end of the spring member 29 engages the outer periphery of the pinion gear 27.

The numeral 30 indicates a cylindrical sleeve which abuts the flange 22, and the sleeve 30 is provided with a plurality of inwardly projecting teeth 31, and the cam piece 32. There is further provided an annular collar 33 which is interposed between the support member 25 and the sleeve 30, and the collar 33 includes a plurality of inwardly projecting teeth 34, Figure 7. A second pinion gear 35 is rotatably mounted on the shaft 26, and the pinion gear 35 is adapted to engage the teeth 34 on the collar 33, and the pinion gear 35 is also adapted to engage the cam piece 32 on the sleeve 30. The numeral 36 indicates a second spring member which has a portion thereof projecting through the opening 28 in the support member 25, and the spring member 36 engages the outer periphery of the pinion gear 35.

The numeral 37 indicates a spacer member which is interposed between the pinion gear 35 and the support member 25. As shown in Figure 2 for example, indicia or scale markings are arranged on the outer periphery of the wheel 15, sleeve 30, and collar 33, and these scales are indicated respectively by the numerals 38, 39, and 40, and these scale markings or indicia are visible through the window 14 so that the distance traversed by the tire 19 can be readily observed through the window 14.

From the foregoing, it is apparent that there has been provided a measuring instrument which is an improvement over the measuring instrument shown and described in my prior Patent No. 2,363,545. In use, the tip 12 can be used as a writing instrument in the usual manner, and the other end of the instrument 10 functions as a means for measuring distances along various surfaces. To measure distances, the tire or element 19 is rolled along the surface to be measured, and this causes rotary movement of the wheel 15 in the housing 11. As the wheel 15 turns, it rotates the pair of cams 24 on the flange 22, and this in turn rotates the pinion gear 27 on the shaft 26. As the pinion gear rotates, the teeth 31 of the sleeve 30 will be rotated and this in turn will cause rotation of the cam 32 which in turn will result in turning movement of the pinion gear 35. As the pinion gear 35 turns, the teeth 34 will rotate the collar 33. Thus, it will be seen that as the element 19 is moved along the surface being measured, the scales 38, 39 and 40 will be moved since these scales are arranged on the outer surfaces of the wheel 15, sleeve 30 and collar 33. The amount of movement of the scales is proportional to the amount of rotation of the wheel 15 so that the linear movement corresponding to the distance being measured will result in a corresponding movement of the scales so that the distance being measured will appear through the window 14. For example, as shown in Figure 1, the scale shows 32½ and this may indicate that the distance being measured is 32½ inches. The representations of the scales 38, 39 or 40 shown in Figures 10 and 11 is schematic and the scales have been shown in elongated formation for the purpose of illustrating the entire scales. The scales or markings 39 and 40 each have the same arrangement of indicia thereon, as shown in Figure 11.

The parts can be made of any suitable material and in different shapes and sizes.

As previously stated, the instrument 10 includes a barrel or housing 11, and an end of shaft 26 is adapted to be pressed into the support member 25, the spacer member 37 and pinion gears 35 and 27 being journaled on the shaft 26. The support member 25 serves to retain the shaft 26 and spring members 29 and 36 in place, and the support member 25 is pressed into the housing or barrel 11 so that the support member 25 is fixed and does not rotate. The member 37 constitutes a spacing collar. The pinion gears 35 and 27 are free to revolve on the shaft 26. The numeral 15 indicates the primary counter wheel which revolves in the housing 11 and on its periphery are suitable indicia such as the eight digits and fractions shown in Figure 10. The two cams 24 are arranged on the inner surface of the flange 22. The split ring 21 serves to maintain the wheel 15 in the housing 11.

The tire 19 may have a peripheral circumference of two inches. The spring members 29 and 36 serve to orient the pinion gears in relation to the cam. The collar 33 revolves in the housing 11 and has ten teeth 34 internally thereof which mesh with the pinion gear 35, and on the periphery of the collar 33 are the digits 1, 2, 3, 4, 5, 6, 7, 8 9, and 0. The sleeve 30 also revolves in the housing and it also has a ten tooth internal gear which is indicated by the numeral 31 and there is further provided the cam 32. The gear 31 meshes with the pinion gear 27, and the cam 32 actuates the pinion gear 35. The digits on the sleeve 30 are also numbered from 1 to 9 and 0. The tip 12 may be a mechanical pencil or ball point 10 or the like which is inserted into the barrel or housing.

The operation of the measuring instrument is as follows. By rolling the tire 19 along the surface of an object, the length of the object will appear on the counting wheels through the window 14. Thus, for each half revolution, or one inch of circumference or length, that the wheel 15 revolves, the cam 24 will, through motion imparted to pinion gear 27, revolve the sleeve 30 one-tenth of a revolution. As the sleeve 30 revolves one revolution, the cam 32 will, through motion imparted to pinion gear 35, revolve collar 33 one-tenth of a revolution.

Revolving the tire clockwise, that is with the point of the pencil towards the viewer, will result in a progression of the count 4, 5, 6, 7, etc. Revolving counter clockwise results in a regression of the count 9, 8, 7, 6, etc. The range of the device as shown is 0" to 100". If desired, metric measurements and scale measurements can be obtained by varying the tire circumference and number of cams on the flange 22.

The above description of the invention is for illustrative purposes only and it is understood that modifications may be made in the construction within the scope and spirit of the following claim.

I claim:

In a measuring instrument for a writing implement of the type that includes a hollow housing having a writing tip on one end thereof, the improvement consisting in providing a cutout in a wall portion of said housing which defines a window, a wheel embodying a portion of reduced diameter seated in said housing, said wheel having a portion which extends out beyond the end of the housing and said extending end of the wheel being provided with an annular groove, a resilient annular surface engaging element positioned in said groove, said surface engaging element having a diameter which is greater than said wheel, there being an annular recess in that portion of the wheel which is positioned in the housing, a spring member arranged in said recess and engaging said housing, said wheel being provided with a hollow chamber which provides a flange on the inner end thereof, a pair of diametrically opposed cam members projecting inwardly from said flange, a non-rotary support member fixedly mounted in said housing, a shaft projecting through said support member and abutting the inner end of said wheel, the longitudinal axis of said shaft being parallel to the longitudinal axis of the writing tip, a first pinion gear mounted on said shaft, said first pinion gear adapted to engage the cams on said flange, said support member having an opening therein, a first spring member provided with a portion which projects through said opening and a portion of said spring member engaging said pinion gear, a sleeve arranged in said housing and abutting the flange on said wheel, teeth extending inwardly from said sleeve and engaging said pinion gear, a cam piece projecting from said sleeve, a collar arranged in said housing and positioned between said support member and sleeve, teeth projecting inwardly from said collar, a second pinion gear mounted on said shaft and said second pinion gear adapted to engage the teeth on the collar and said second pinion gear adapted to engage the cam piece on the sleeve, said first and second pinion gears being free to revolve on said shaft, a second spring member engaging said second pinion gear and said second spring member having a portion thereof extending through the opening in said support member, and a spacer member interposed between said second pinion and said support member and said spacer member being arranged on said shaft; the outer periphery of the wheel, sleeve and collar having indicia thereon which are adapted to be observed through said window.

References Cited in the file of this patent

UNITED STATES PATENTS

| | | |
|---|---|---|
| 1,940,134 | Levin | Dec. 19, 1933 |
| 1,950,617 | Lee | Mar. 13, 1934 |
| 2,188,201 | Diedrich | Jan. 23, 1940 |
| 2,363,545 | Morehead | Nov. 28, 1944 |
| 2,524,385 | Hyland et al. | Oct. 3, 1950 |
| 2,597,212 | White et al. | May 20, 1952 |
| 2,777,206 | Sparrow | Jan. 15, 1957 |